United States Patent [19]

O'Brian et al.

[11] 3,751,078

[45] Aug. 7, 1973

[54] PIPE JOINTS

[76] Inventors: John Leslie O'Brian; Bryan Finnimore; Dallas John Arthur Hogg, all of c/o John L. O'Brian & Associates, 70 Derby St., Auburn, New South Wales, 2144, Australia

[22] Filed: Aug. 26, 1971

[21] Appl. No.: 175,092

[52] U.S. Cl.............. 285/339, 285/348, 285/362, 285/374, 285/DIG. 22
[51] Int. Cl............................................ F16l 21/02
[58] Field of Search............... 285/358, 374, 339, 285/421, 362, 377, 356, 403, 348

[56] References Cited
UNITED STATES PATENTS

| | | | |
|---|---|---|---|
| 1,474,437 | 11/1923 | McWane | 285/374 X |
| 2,992,839 | 7/1961 | Simonini | 285/421 X |
| 2,145,645 | 1/1939 | Byers | 285/403 |
| 1,588,444 | 6/1926 | Carson | 285/377 X |
| 3,480,302 | 11/1969 | Jeffery et al. | 285/362 |

FOREIGN PATENTS OR APPLICATIONS

| | | | |
|---|---|---|---|
| 116,571 | 6/1946 | Sweden | 285/358 |
| 735,754 | 6/1966 | Canada | 285/374 |
| 1,250,879 | 12/1960 | France | 285/374 |

*Primary Examiner*—Thomas F. Callaghan
*Attorney*—Eric H. Waters et al.

[57] ABSTRACT

The invention provides a spigot and joint wherein an internal sealing ring between the spigot and joint is retained in position by an insertable latched ring. In another modification the sealing ring is retained in position between the spigot and socket members by a gland ring and separate wedges. Axial displacement of the gland ring to compress the sealing ring is achieved by disposing the wedges between a beveled lug at the mouth of the socket and a lug on the outer face of the gland ring.

2 Claims, 7 Drawing Figures

PIPE JOINTS

This invention relates to spigot and socket pipe joints.

The principal object of the present invention is to provide improved seals for such joints, satisfactory means for retaining the seals in position and satisfactory means for limiting or preventing withdrawal of the spigot from its socket.

The joint according to the invention is designed primarily for use with pipes and tube for the conveyance of water, sewage, gas and other fluids that require a positive seal and can be used with metallic and non metallic pipes.

It provides the following features:

a. It is more compact than known joints that require a pressure plate to compress a rubber seal.

b. No bolts or bolt holes are necessary to hold the pressure plate in position.

c. The rubber seal can be retained within the socket prior to assembly of the joint.

d. It is more economical to produce.

e. It occupies less space.

f. It is easier to install. The pressure plate can be secured in any position and at one point.

g. It is suitable for most conditions of use.

This invention provides a spigot and socket joint construction wherein the spigot is located in the socket, the construction including a resilient sealing ring surrounding the spigot within the socket and means for retaining the sealing ring in this position.

A description of one form of the joint follows:

The joint comprises a socket with a retaining groove into which is fitted the rubber gasket. The gasket has a shaped section around its external circumference that fits into the internal groove in the socket. When compressed it effects a seal at two points against the barrel of the pipe which is inserted in the normal manner into the socket of the pipe.

The top of the socket is so shaped that it provides the means of anchorage for a circular shaped retaining component which is constructed so that, when tightened, it looks into the top of the socket.

In one embodiment, this retaining component is circular in form U-shaped in section, with the outer leg extended. The outer leg may be split to form latches. It may be made of stainless steel or any other material suitable for pressing, for example, plastics material. Although it is preferably in one piece, it may also be hinged and joined so as to produce the circular form.

The retaining component may be fitted with means of expanding and tightening it to its locked position. This may be of any suitable form, for example, a wedge or screw driven clip.

The retaining component compresses the gasket against the barrel of the pipe as it is tightened into its locked position and in so doing also exerts pressure onto the bottom section of the rubber.

When the retaining component is completely tightened it forms an almost perfect circle. In its locked position it prevents any outward movement of the gasket which may be caused by back pressure in the liquid. Any expanding action that may take place through "creep" is prevented, although the gasket in its locked position provides adequate flexibility.

The invention is suitable for use in respect of cast or spun iron pipes and fittings but may be used with other metallic or non-metallic pipes and pipe fittings. In particular it is useful where problems of expansion are encountered, for example, with plastics materials.

Several forms of the invention are shown in the accompanying drawings in which.

Figure 1:
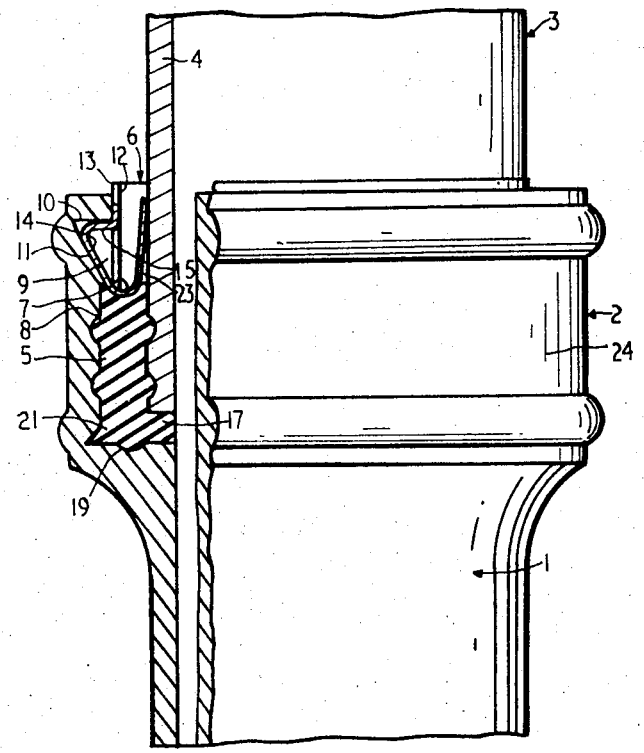
FIG. 1 is an elevation in part longitudinal section of a first form, showing a spigot and socket joint according to the invention on a low pressure pipe.

The principal components are the pipe 1, of which the socket end 2 is shown and the pipe 3 of which the spigot end 4 is shown located in the socket 2. Adequate sealing is provided by a sealing ring 5 of rubber or other suitable material, which is retained in position by means of a stainless steel circlip ring 6. The circlip may be a single continuous ring for the full circumference of the joint or two or more end-to-end abutting rings. The ring 6 is U-shaped in cross section, the base 7 of the U engaging the outer end 8 of the sealing ring 5. At intervals around the ring 6, resilient latches 9 are formed which are adapted to engage a surface 10 of a peripheral groove 11 formed continuously around the inside of the socket.

A typical latch is formed by providing two spaced parallel slits in the outer leg 12 of the U-section, the slits extending from the edge 13 to the base 7 of the U. The metal between the slits is formed into an angle member having a sloping portion 14 and an inward portion 15.

Figure 2:
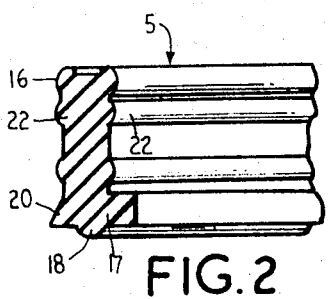
FIG. 2 is a sectional detail of a seating ring shown in FIG. 1.

The sealing ring 5 is shaped as shown in FIG. 2. Its upper part has inside and outside enlargements 16 extending for its full circumference and adapted to engage the outside surface of the spigot and the inside surface of the socket.

The base portion 17 has a similar enlargement 18 adapted to engage a shoulder 19 on the socket. It may also have a projecting portion 20 adapted to seat in a further recess 21 formed in the socket. Additional enlargements 22 extending around the ring may be provided to engage the outside of the spigot and the inside of the socket.

In use the sealing ring 5 is first placed in position in the socket. The spigot is then inserted until its end engages the portion 17 of the ring. The ring 6 is then forced into the space between the outer end of the socket and the outside of the spigot. To permit this, the resilient latches 9 move readily towards the inner leg 23 of the ring until the latches pass the surface 10 when the latches spring outwards.

To facilitate removal of the ring 6 the outer leg 12 of the U is made deeper than the inner leg 23 so that, in the final position the edge of the outer leg protrudes from the socket.

The ring 6 is forced into the space between the spigot and the socket by any suitable means. One suitable means is by means of a jack clamped around collar 24 and extending beyond the end of the collar and carrying screw jack legs or the like parallel to the pipe axis and in register with the opening of the ring 6. The legs can then be screwed or otherwise forced into the ring 6 and against its base 7. The joint components are shaped and dimensioned so that in the innermost position shown for the ring 6, the sealing ring 5 is sufficiently compressed axially that the enlargements 16, 18 and 22 closely engage the spigot and socket surfaces.

Figure 3:
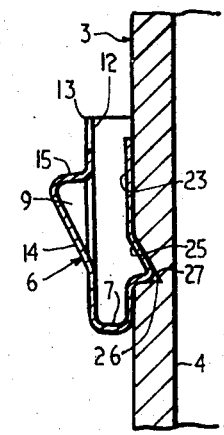
FIG. 3 is a sectional detail of a modified circlip ring and spigot for use on a high pressure pipe.

In pipes containing liquids at higher pressures an additional projection 25 is formed on the inner leg of the U as shown in FIG. 3 and this engages a shoulder 26 on a recess 27 formed in the outside of the spigot. Outward movement of the ring 6 in relation to the socket is prevented by the latches 9 engaging the surfaces 10 and outward movement of the spigot in relation to the ring 9 is prevented by the shoulder 26 engaging the projection 25.

In this case an O-ring seal located between the surface of 14 and the inside of the socket may replace the seal 5.

In use, a more convenient practice for inserting the components 5 and 4 may be to place the sealing ring 5 onto the plain spigot end 4 of the pipe and then to thrust it into the socket.

Figure 4:
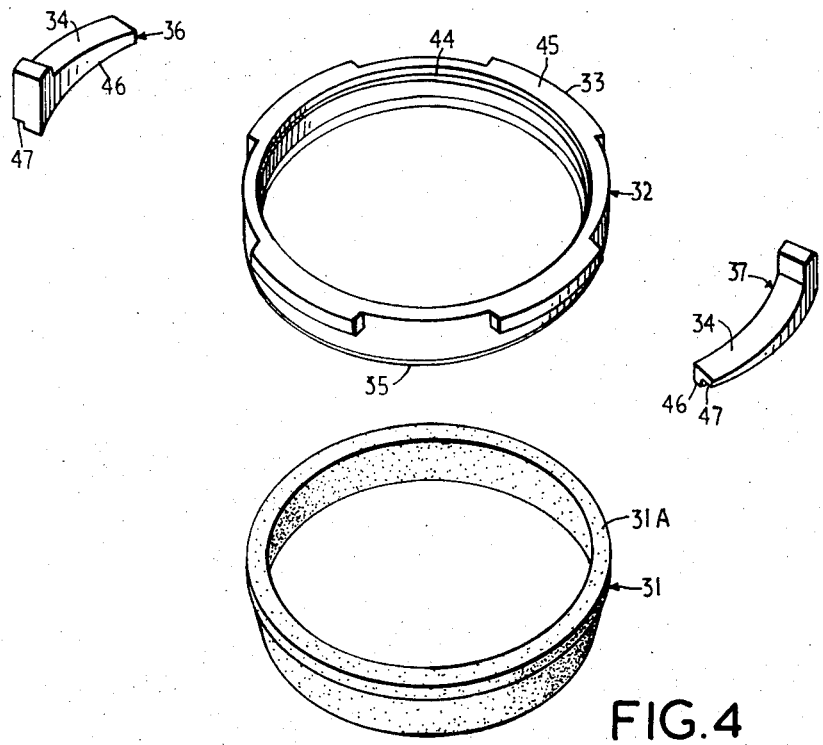
FIG. 4 is an exploded perspective view of the component parts of a second form of the spigot and socket joint which is suited to pipelines subjected to a higher pressure than is the first form shown in FIGS. 1, 2 and 3.
Figure 4:
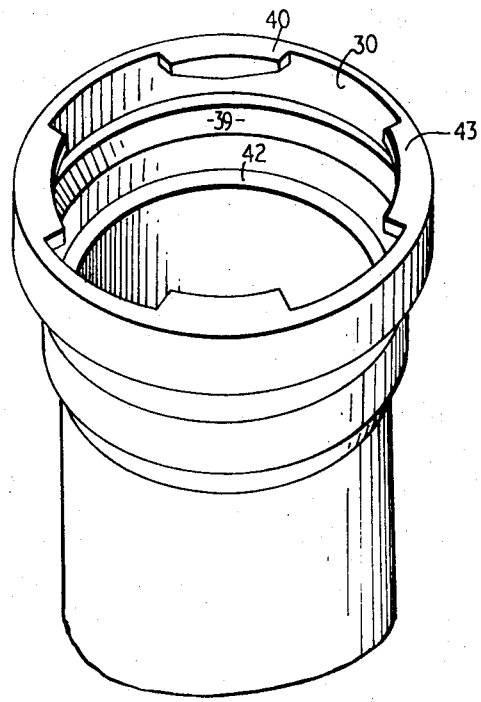
Figure 5:
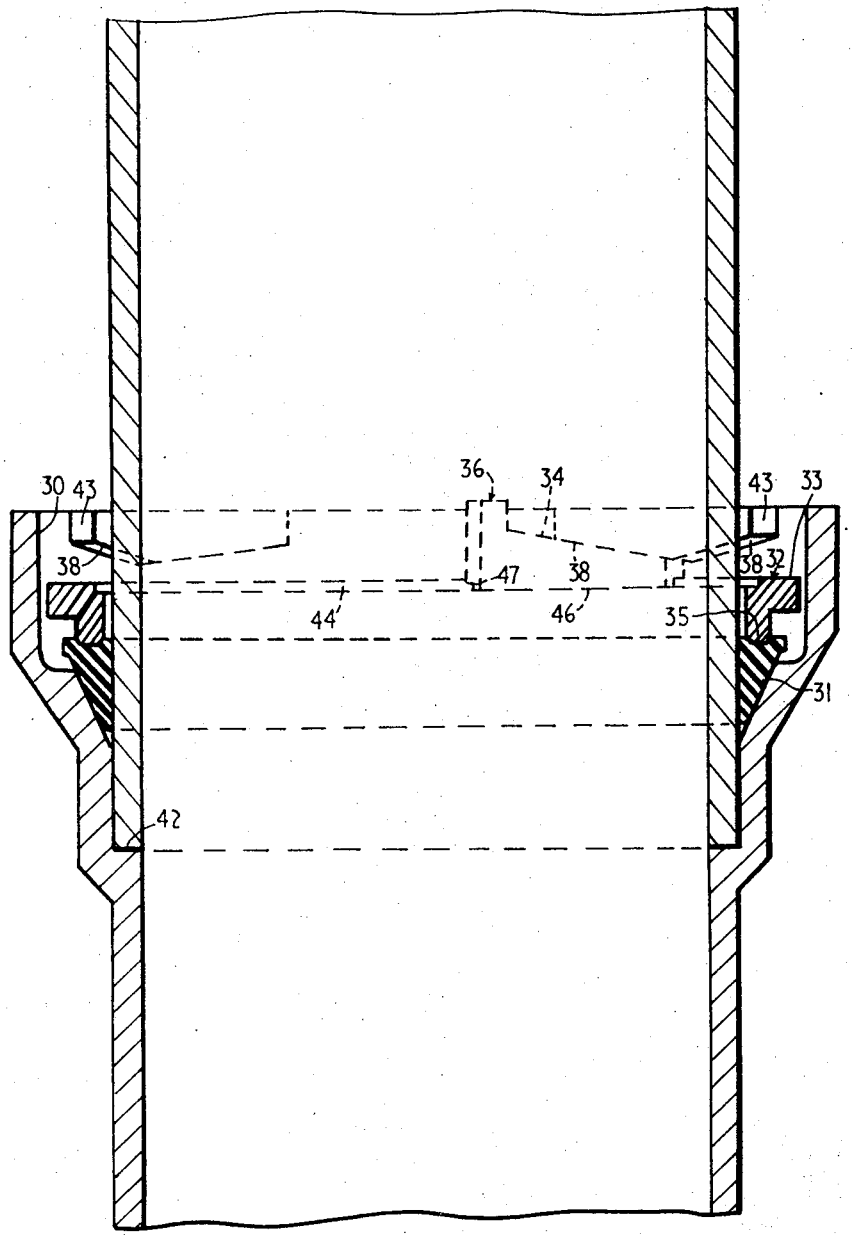
FIG. 5 is an elevation in longitudinal section of the assembled components of FIG. 4.

In FIGS. 4 and 5 of the accompanying drawings, FIG. 4 is an exploded view of the joint and FIG. 5 is a longitudinal section.

The pipe collar or socket includes an internal bore 30 and a bevel surface 39. The upper edge 40 of the socket is provided with a discontinuous flange 43. The spigot has placed around it a gland ring 32 with a discontinuous flange 33. The wall of the gland ring remote from the flange is provided with a bevel surface 35. A sealing ring 31 also surrounds the pipe. The bevel surface 35 of the gland ring 32 engages the upper surface 31A of the sealing ring, deforming it as shown in FIG. 5 and forcing it into contact with socket bevel surface 39 and also the pipe spigot.

The underside 38 of each section of the flange 43 is ramped as shown in FIGS. 4 and 5 and wedges 36 and 37, having upper surfaces 34, ramped to a similar angle, are used as a means for locking the joint. The flanges 33 are retained in position under the flanges 43 and they are tightened in position by placing the wedges 36 and 37 between each flange 43 and the upper surface of the flange 33.

The gland ring 32 is provided with a shallow groove 44 in its upper face 45. The underside 46 of each wedge 36 and 37 are also provided with a groove 47 of similar radius of curvature to that of the groove 44. When the wedges 36 and 37 are entered between the flanges 43 and 33 they are prevented from being displaced radially with respect to the pipe, by the engagement of their grooves 47 with the groove 44. In this way the same size wedges and gland ring can be used over a small range of pipe sizes with resultant economy of components. The bland ring 32 engages the sealing ring 31 and provides a fluid tight joint between spigot and pipe socket. The inner end of the pipe rests on a shoulder 42. The wedges 36 and 37 may be made either right or left handed to facilitate insertion between the socket flange 43 and the gland ring flange 33.

Figure 6:
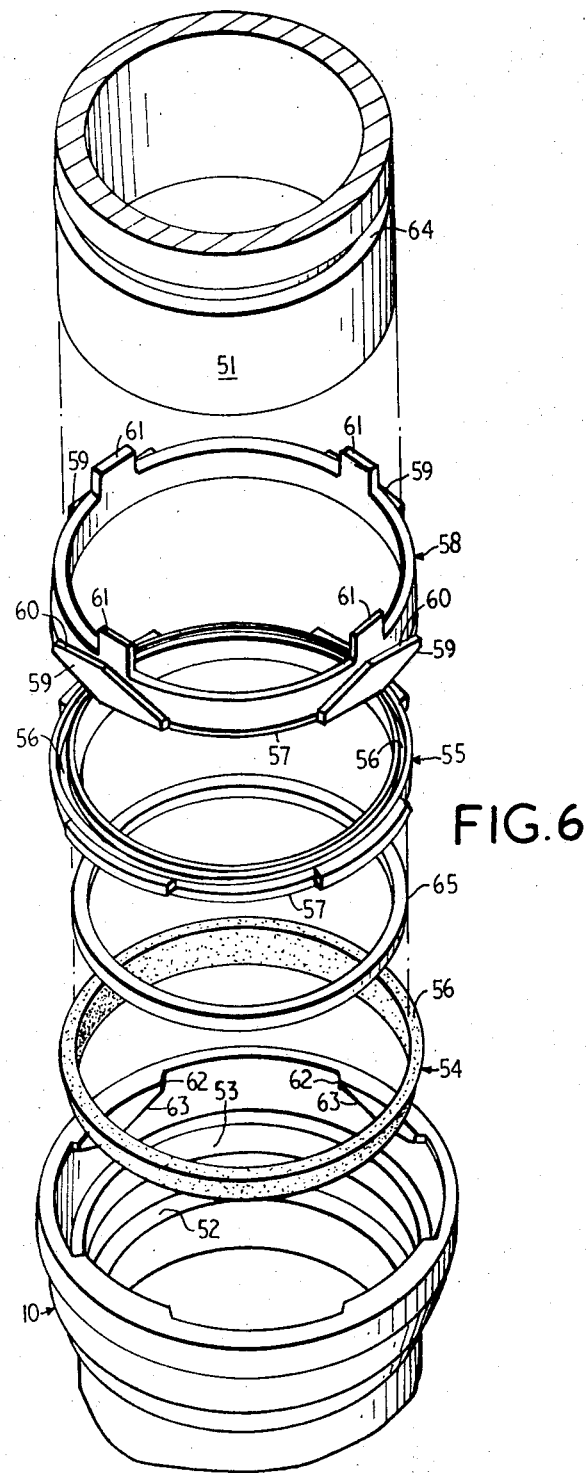
FIG. 6 is an exploded perspective view of the component parts of a third form of spigot and socket joint using a different locking device.
Figure 7:
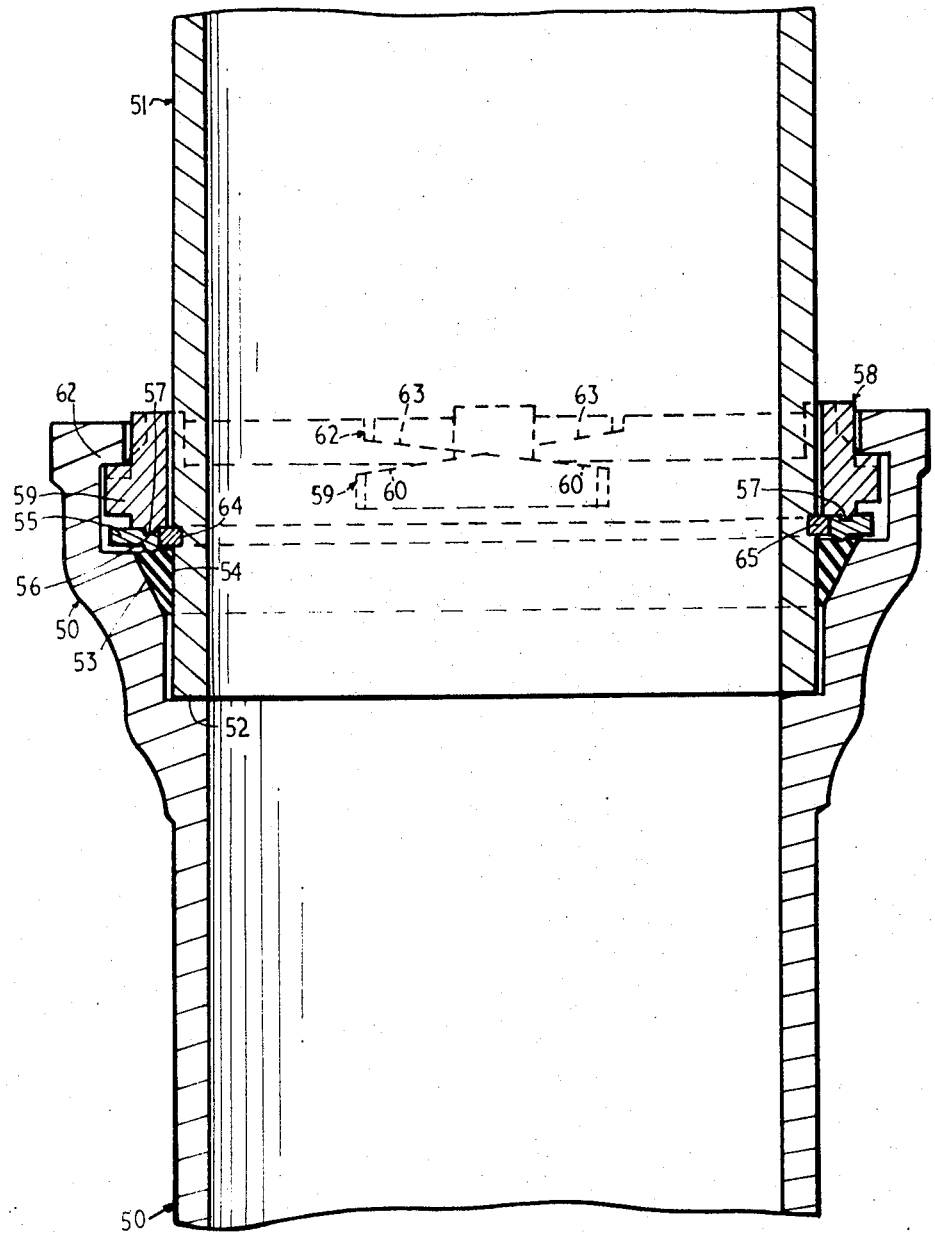
FIG. 7 is an elevation in longitudinal section of the assembled components of FIG. 6.

A third form of the invention is illustrated in FIGS. 6 and 7. In this embodiment which is also suitable for pipelines subjected to medium pressures, the wedges used in the second embodiment are replaced by a gland ring.

50 shows a socket end of one section of the pipe adapted to receive a spigot 51 on the end of the adjacent pipe section. The spigot end engages a shoulder 52 on the socket.

A substantially fluid tight joint between the spigot and socket comprises a ring 54 of rubber or other suitable material located within the socket around the spigot, the inner end of the ring 54 being adapted to engage a sloping surface 53 in the socket. The outer end 56 of the ring 54 is adapted to be engaged by a circumferential rib 57 on the inner face of an auxiliary ring 55. The outer face of the ring 55 has a locating groove 56 adapted to receive a corresponding locating ring 57 on the inner face of a gland or locking ring 58. The ring 58 carries integral circumferentially spaced lugs 59, each of which has formed on its outer surface a double wedging ramp 60. The ring 58 also has circumferentially spaced integral projections 61. The socket 50 has provided on its inside surface near its outer end circumferentially spaced lugs 62 each having on its inward face a double wedging ramp 63. The lugs 62 on 50 and the lugs 59 on 58 are located and dimensioned so that the ring 58 may be inserted into the socket around the spigot with each lug 59 entering between adjacent lugs 62. The ring 58 can then be rotated about its axis so as to bring the wedging surfaces 60 into engagement with the surfaces 63. The double arrangement of wedging faces enables this to be done by either clockwise or anti-clockwise rotation of the ring 58.

In some circumstances, for example, when the joint is under high pressure, movement of the spigot out of the socket can be limited or prevented by providing a groove 64 around the outside of the spigot in which is located a circlip 65. The circlip is inwards of the inward face of the ring 58. Outward movement of the ring 58 is normally prevented by its lugs 59 engaging the lugs 62 which are integral with the socket 50. During any outward movement of the spigot, the circlip 65 engages the inner surface of the ring 58 which prevents further movement of 51.

In some cases there will be four lugs 62 and four lugs 59. This number may be varied, up or down, in special circumstances, the minimum number of lugs in each case being two.

In some circumstances the section of the auxiliary ring 55 may be varied and components 56 and 57 may be omitted.

What we claim is:

1. A spigot and socket joint construction wherein the spigot is located in the socket, the construction including a resilient sealing ring surrounding the spigot within the socket and means for retaining the sealing ring in this position, the retaining means comprising a gland ring surrounding the spigot within the socket and engaging the sealing ring, circumferentially spaced radially inward lugs on the open end of the socket, each lug having a ramp on its axially inward face, circumferentially spaced radially outward lugs on the gland ring equal in number to the socket lugs and each shorter than the socket lug spacing and wedges, each located between a socket lug and a corresponding gland ring lug and displaceable circumferentially and having one face engaging the gland ring lug and an inclined face engaging the ramp of the corresponding socket lug so that circumferential displacement of the wedges causes axial displacement of the gland ring.

2. A spigot and socket joint construction as claimed in claim 1, said axially inward face of each lug having two ramps inclined in opposite directions circumferentially.

* * * * *